US006679347B2

(12) United States Patent
Iimuro (10) Patent No.: US 6,679,347 B2
(45) Date of Patent: Jan. 20, 2004

(54) FRAME STRUCTURE OF MOTORCYCLE (75) Inventor: Osamu Iimuro, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 48 days.

(21) Appl. No.: 10/141,972

(22) Filed: May 10, 2002

(65) Prior Publication Data
US 2002/0189878 A1 Dec. 19, 2002

(30) Foreign Application Priority Data
Jun. 12, 2001 (JP) ........................................ 2001-177535

(51) Int. Cl.7 ............................................... B62D 61/02
(52) U.S. Cl. .................... 180/219; 180/227; 280/285
(58) Field of Search ................................ 180/218–220, 180/227, 228; 280/284–286, 281.1

(56) References Cited

U.S. PATENT DOCUMENTS

| 4,727,953 | A | * | 3/1988 | Kudo et al. | 180/219 |
| 4,887,687 | A | * | 12/1989 | Asai et al. | 180/219 |
| 5,016,725 | A | * | 5/1991 | Muramatsu | 180/225 |
| 5,211,255 | A | * | 5/1993 | Fukuda | 180/219 |
| 5,261,504 | A | * | 11/1993 | Katsura | 180/219 |
| 6,290,015 | B1 | * | 9/2001 | Horii et al. | 180/219 |
| 6,371,236 | B1 | * | 4/2002 | Fukunaga | 180/219 |
| 6,601,666 | B2 | * | 8/2003 | Okuma et al. | 180/227 |

FOREIGN PATENT DOCUMENTS

JP           7-84190           9/1995

* cited by examiner

Primary Examiner—Lesley D. Morris
Assistant Examiner—L. Lum
(74) Attorney, Agent, or Firm—Birch, Stewart, Kolasch & Birch, LLP (57) ABSTRACT A frame structure for a motorcycle in which the shape of the connecting tube may be determined so as to ensure a smooth flow of air therein. The prescribed portion of the left pivot plate faces towards the outer surface of the connecting tube by extending the pivot plates to the position above the rear end portions of the mainframes. In addition, a recess is provided for receiving the outer surface of the connecting tube on the prescribed portion by forming the pivot plates by casting or forging.

18 Claims, 8 Drawing Sheets

FRAME STRUCTURE OF MOTORCYCLE

CROSS-REFERENCE TO RELATED APPLICATIONS

The present application claims priority under 35 USC 119 to Japanese Patent Application No. 2001-177535 filed on Jun. 12, 2001 the entire contents thereof is hereby incorporated by reference.

BACKGROUND OF THE INVENTION

1. Field of the Invention

The present invention relates to a frame structure of a motorcycle in which a connecting tube for introducing air from an air cleaner into a carburetor is disposed in the vicinity of the rear end portion of the vehicle body frame.

2. Description of the Background Art

The motorcycle includes a vehicle body frame as a framework for supporting an engine and other members. A vehicle body frame is disclosed in Japanese Patent Laid-Open No. 84190/1995 entitled "FRAME STRUCTURE IN VEHICLES SUCH AS A MOTORCYCLE." This frame structure will be described below referring to FIG. 3 of this publication which corresponds to FIG. 9 in the drawings.

Figure 9:
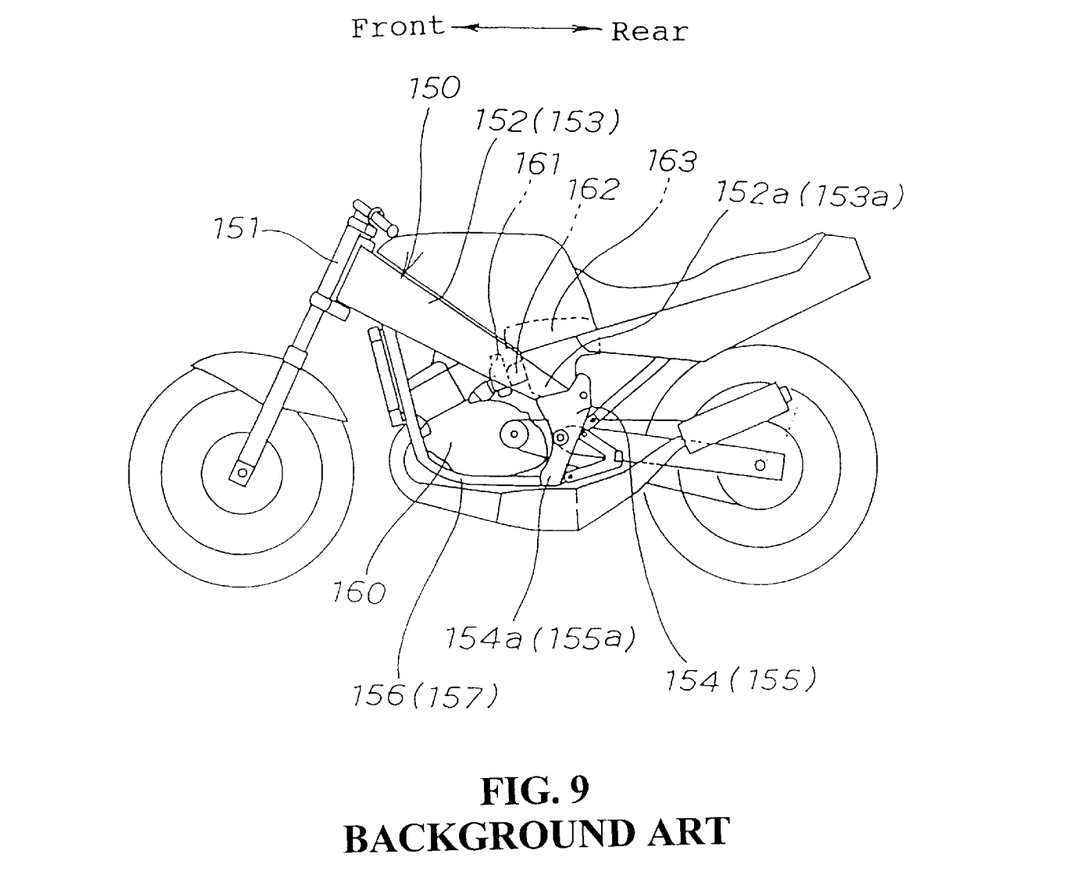
FIG. 9 is a side view of the motorcycle including a frame structure of the related art.

FIG. 9 is a side view of the motorcycle including a frame structure of the related art, showing a state in which a vehicle body frame 150 of a motorcycle comprises a pair of left and right main pipes 152, 153 extending from the head pipe 151 to the rear of the vehicle body. A pair of left and right brackets 154, 155 are joined to the rear end portion 152a, 153a of the main pipes 152, 153 respectively. A pair of left and right down tubes 156, 157 extend from the lower end portion 154a, 155a of the bracket 154, 155 to the front of the vehicle body.

An engine 160 is mounted between the left and right main pipes 152, 153, and the left and right down tubes 156, 157. A carburetor 161 is connected to the engine 160 with a connecting tube 162 extending from the carburetor 161 along the rear end portion 152a of the left main pipe 152. An air cleaner 163 is connected to the connecting tube 162.

Accordingly, air from the air cleaner 163 is introduced into the carburetor 161 via the connecting tube 162. The introduced air may be supplied to the engine after fuel is mixed with the air.

An important requirement for maintaining optimum engine performance of the motorcycle is to supply air to the carburetor 161 in a suitable manner. In order to supply air to the carburetor 161 in a suitable manner, it is necessary for the air to flow from the air cleaner 163 smoothly in the connecting tube 162.

In order to ensure smooth flow of air in the connecting tube 162, it is necessary to form the flow path of the connecting tube 162 in a naturally curved shape, and in order to form it in a naturally curved shape, it is necessary to reserve an enough space for disposing the connecting tube 162.

Since the rear end portion 152a of the left main pipe 152 is exposed to the space where the connecting tube 162 is to be disposed, whether or not enough space can be reserved largely depends on the shape of the left main pipe 152.

The left and right main pipes 152, 153 constituting the vehicle body frame 150 of a motorcycle generally tends to use many extruded moldings, and thus the thickness of the cross section of the left main pipe 152 is constant from the front end portion 152b through the rear end portion 152a.

In addition, the left and right main pipes 152, 153 have to be thick enough to ensure rigidity of the vehicle frame 150. Therefore, the thickness of the rear end portion 152a of the left main pipe 152 increases, and thus enough space for disposing the connecting tube 162 cannot be reserved.

Therefore, the flow path of the connecting tube 162 cannot be formed into a naturally curved shape, and thus smooth flow of air in the connecting tube 162 cannot be ensured, which makes it difficult to maintain the engine performance of the motorcycle in a suitable condition.

SUMMARY AND OBJECTS OF THE INVENTION

Accordingly, it is an object of the present invention to provide a frame structure for a motorcycle in which the connecting tube can be configured in a shape that ensures smooth flow of air.

In order to achieve the aforementioned object, the present invention is directed to a motorcycle wherein a pair of left and right mainframes extend from a head pipe to the rear of the vehicle body. A pivot plate is joined to the rear ends of the mainframes. A rear swing arm extends rearwardly from the pivot plate. An air cleaner is mounted above the rear swing arm with the air cleaner being connected to the carburetor via a connecting tube. The carburetor is connected to the engine located below the mainframe. The pivot plate is a member formed by casting or forging wherein the pivot plate extends to a position above the rear end portion of the mainframe so that a prescribed portion of the pivot plate faces towards the outer surface of the connecting tube. The prescribed portion is formed with a recess for accommodating the outer surface of the connecting tube and a rear shock absorber is provided for supporting the rear swing arm that is mounted on the upper end portion of the pivot plate extending to the position above the mainframe.

By employing a member formed by casting or forging as a pivot plate, a recess for accommodating the outer surface of the connecting tube may be formed at a prescribed portion on the pivot plate during the process of forming the pivot plate. In this manner, by forming a recess at the prescribed portion, a space for disposing the connecting tube may be increased.

By reserving enough space, freedom of determination of the shape of the connecting tube increases and thus the connecting tube may be formed in a shape that allows smooth flow of air therein.

The present invention is directed to including an end face of the rear end portion of the mainframe that is inclined in such a manner that the upper portion is positioned forward of the lower portion.

By inclining the end face of the rear end portion of the mainframe in such a manner that the upper portion is positioned forward of the lower portion, the end face of the rear end portion of the mainframe may be tipped forward to set the mainframe apart from the connecting tube.

By setting the mainframe apart from the connecting tube, the prescribed portion of the pivot frame may face towards the outer surface of the connecting tube. By forming a recess on the prescribed portion, the space in which the connecting tube is to be disposed may be increased.

Therefore, the freedom of determining the shape of the connecting tube may be increased.

In addition, by tipping forward the end face of the rear end portion of the mainframe, the joint between the mainframe and the pivot plate may be elongated. Therefore, the strength of the joint may be increased.

The present invention includes a rear end portion of the mainframe that is positioned in the vicinity of the rear end portion of the carburetor.

By positioning the rear end portion of the mainframe in the vicinity of the rear end portion of the carburetor, the rear end portion of the mainframe may be set apart from the connecting tube more positively, so that the prescribed portion of the pivot frame may face towards the outer surface of the connecting tube. By forming a recess on the prescribed portion, the space for disposing the connecting tube may be increased. Therefore, the freedom of determining the shape of the connecting tube is increased.

The present invention includes a rear end portion of the mainframe that is positioned forward of the rear end portion of the carburetor.

By positioning the rear end portion of the mainframe forward of the rear end portion of the carburetor, the rear end portion of the mainframe may be set apart from the connecting tube more positively. Therefore, the prescribed portion of the pivot frame may easily face towards the outer surface of the connecting tube.

Therefore, since the prescribed portion of the pivot frame may face towards the outer surface of the connecting tube relatively easily, the recess may be provided at the suitable position.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 8(*a*) and 8(*b*) are explanatory drawings illustrating the action of the connecting tube according to the first embodiment of the present invention.

DETAILED DESCRIPTION OF THE PREFERRED EMBODIMENTS

Referring now to the attached drawings, one embodiment of the present invention will be described below. The terms "front", "rear", "left" and "right" represents the directions viewed from the driver.

Figure 1:
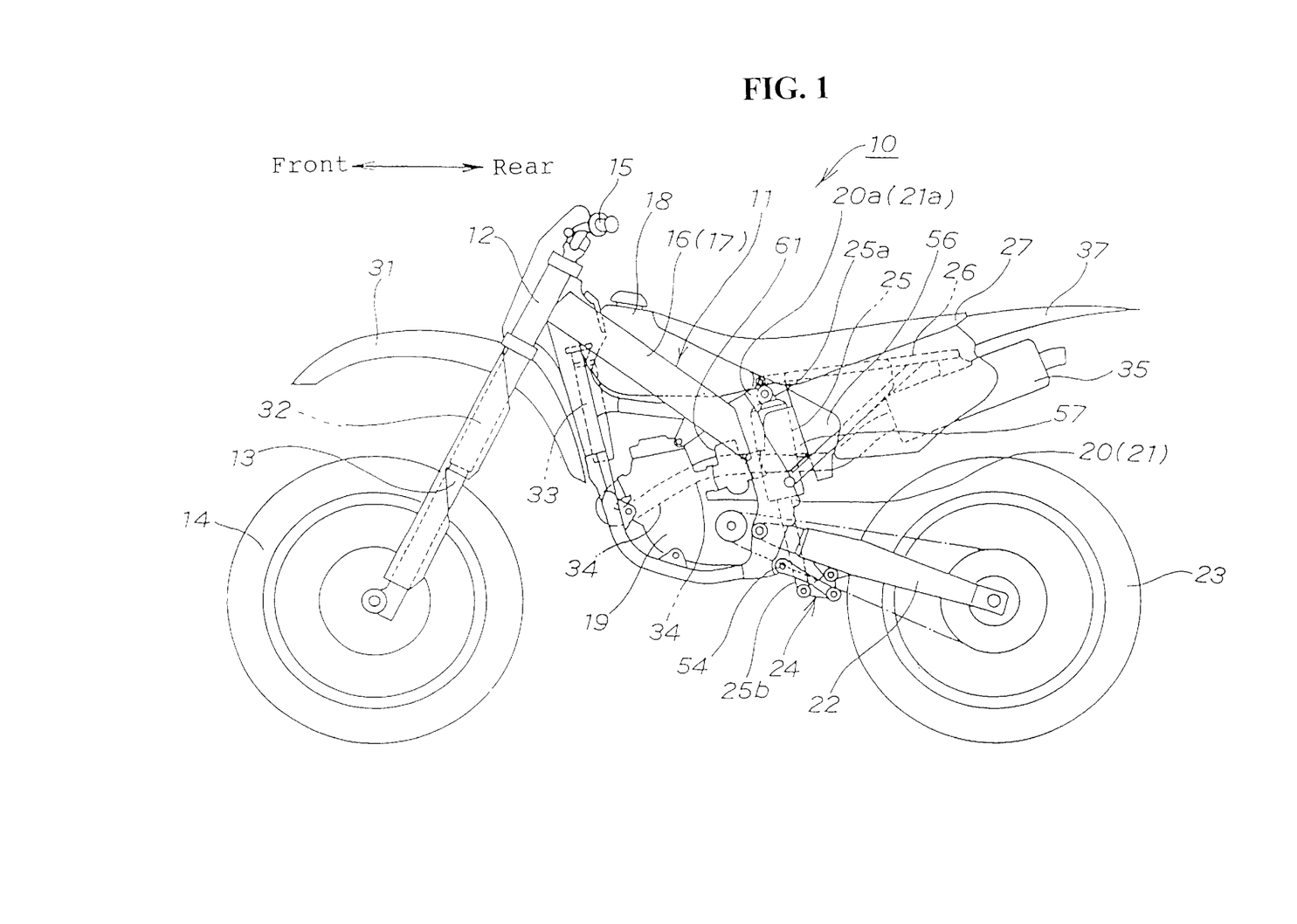
FIG. 1 is a side view of the motorcycle including a frame structure (first embodiment) of the present invention.

FIG. 1 is a side view of the motorcycle including a frame structure (first embodiment) of the present invention. The motorcycle 10 is a vehicle includes a front fork 13 mounted on a head pipe 12 of the vehicle body frame (frame structure) 11 with a front wheel 14 supported by the front fork 13. A handle 15 is mounted on the front fork 13 with a fuel tank 18 mounted on the upper portion (a pair of left and right mainframes 16, 17) of the vehicle body frame 11. An engine 19 is provided below the fuel tank 18. A rear swing arm 22 is mounted on the rear end portion (the left and right pivot plates 20, 21) of the vehicle body frame 11 so as to be capable of a swinging motion with a rear wheel 23 mounted on the rear end portion of the rear swing arm 22. A link mechanism 24 is provided in the vicinity of the front end portion of the rear swing arm 22 with the lower end portion 25*b* of the rear shock absorber 25 being mounted to the link mechanism 24. The upper end 25*a* of the rear shock absorber 25 is mounted to the upper portion of the rear end (upper end portions 20*a*, 21*a* of the pivot plates 20, 21) of the vehicle body frame 11. A rear frame 26 is mounted on the rear end portion of the vehicle body frame 11 with a seat 27 mounted on the upper potion of the rear frame 26.

A front fender 31 is provided adjacent to a front fork cover 32 with a radiator 33, an exhaust pipe 34, a muffler 35, a rear cover 36 and a rear fender 37 operatively mounted on the frame.

Figure 2:
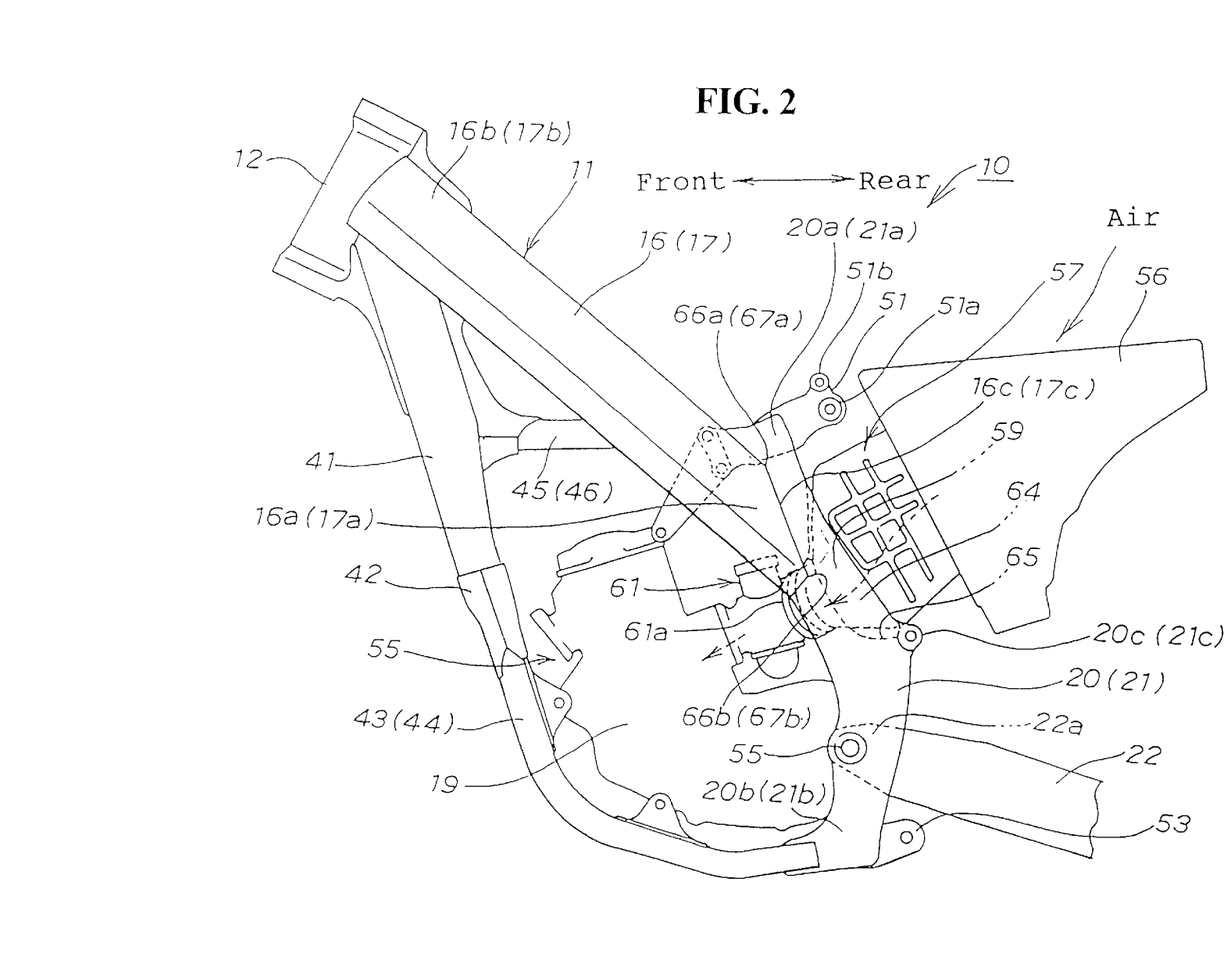
FIG. 2 is a partially enlarged view of FIG. 1.

FIG. 2 is a partially enlarged view of FIG. 1. The vehicle body frame 11 is constructed in such a manner that the pair of left and right mainframes 16, 17 extends from the head pipe 12 to the rear of the vehicle body. The pair of left and right pivot plates 20, 21 are joined to the rear end portions 16*a*, 17*a* of the mainframes 16, 17 respectively. The down tube 41 extends downwardly from the front portions 16*b*, 17*b* of the left and right mainframes 16, 17. A pair of left and right lower pipes 43, 44 are mounted on the down tube 41 via a gusset 42. The left and right lower pipes 43, 44 are joined to the respective lower end portions 20*b*, 21*b* of the pivot plates 20, 21. The down tube 41 and the left and right mainframes 16, 17 are connected by a pair of left and right stiffener pipes 45, 46. The upper portions 20*a*, 21*a* of the left and right pivot plates 20, 21 are connected by the upper supporting bracket 51. The lower end portions 20*a*, 21*a* of the left and right pivot plates 20, 21 are connected by a lower supporting bracket 53.

The lower supporting bracket 53 is connected to a link mechanism 24 via a pin 54 shown in FIG. 1. The upper supporting bracket 51 will be described later.

In addition, the vehicle body frame 11 is constructed in such a manner that the front end 22*a* of the rear swing arm 22 is rotatably mounted at the lower end portions 20*b*, 21*b* of the left and right pivot plates 20, 21 via a pin 55, so that the rear swing arm 22 is supported in a state that extends rearwardly (See also FIG. 1). The engine 19 is mounted in the space 55 between the left and right main frames 16, 17 and the left and right lower pipes 43, 44.

Air from the air cleaner 56, as shown by the arrow, may be supplied to the engine 19 via the connecting tube 57 and the carburetor 61 by providing the air cleaner 56 above the rear swing arm 22, connecting the air cleaner 56 to the carburetor 61 via the connecting tube 57 and connecting the carburetor 61 to the engine 19 located below the mainframes 16, 17.

The pivot plates 20, 21 are members formed by casting or forging, and extend to the position above the rear end portions 16*a*, 17*a* of the mainframes 16, 17.

The prescribed portion 64 of the left pivot plate 20 may face towards the outer surface 59 of the connecting tube 57 by extending the pivot plates 20, 21 to the position above the rear end portions 16a, 17a of the mainframes 16, 17.

In addition, by forming the pivot plates 20, 21 by casting or forging, a recess 65 for receiving the outer surface 59 of the connecting tube 57 may be formed on the prescribed portion 64. The recess 65 will be described in conjunction with FIG. 6 and FIG. 7 later.

The end face 16c of the rear end portion 16a of the left mainframe 16 is inclined in such a manner that the upper portion 66a is positioned forward of the lower portion 66b, and the end face 17c of the rear end portion 17a of the right main frame 17 is inclined so that the upper portion 67a is positioned forward of the lower portion 67b.

Accordingly, the left and right mainframes 16, 17 may be set apart from the outer surface 59 of the connecting tube 57 by tipping forward the end faces 16c, 17c of the rear end portions 16a, 17a of the mainframes 16, 17. Therefore, the left pivot plate 20 can face towards the outer surface 59 of the connecting tube 57, and the recess 65 may be formed on the opposed prescribed portion 64.

In addition, the rear end portion 16a of the left mainframe 16 can be released from (set apart) the outer surface 59 of the connecting tube 57 more positively by positioning the rear end portions 16a, 17a of the left and right mainframes 16, 17 in the vicinity of the rear end portion 61a of the carburetor 61.

This ensures that the left pivot plate 20 faces towards the outer surface 59 of the connecting tube 57, and thus the recess 65 may be formed at the opposed prescribed portion 64.

The left and right pivot plates 20, 21 extend to the position above the left and right mainframe 16, 17 with the upper supporting bracket 51 joined to the upper end portions 20a, 21a of the extended pivot plates 20, 21, and the upper end portion 25a of the rear shock absorber 25 which is shown in FIG. 1 is mounted on the mounting section 51a of the upper supporting bracket 51.

The rear shock absorber 25 can support the rear swing arm 22 so as to be capable of swinging freely by connecting the lower end portion 25b to the position in the vicinity of the front end portion of the rear swing arm 22 via the link mechanism 24 as shown in FIG. 1.

The upper supporting bracket 51 may be formed into a compact shape by extending the upper end portions 20a, 21a of the pivot plates 20, 21 to the positions above the mainframes 16, 17, and connecting the upper supporting bracket 51 for supporting the rear shock absorber 25 to the upper end portions 20a, 21a. Therefore, the connecting process for the upper supporting bracket 51 may be simplified.

The rear frame 26 shown in FIG. 1 is mounted on the mounting section 51b of the upper supporting bracket 51 and on the central mounting section 20c, 21c of the left and right pivot plates 20, 21.

Figure 3:
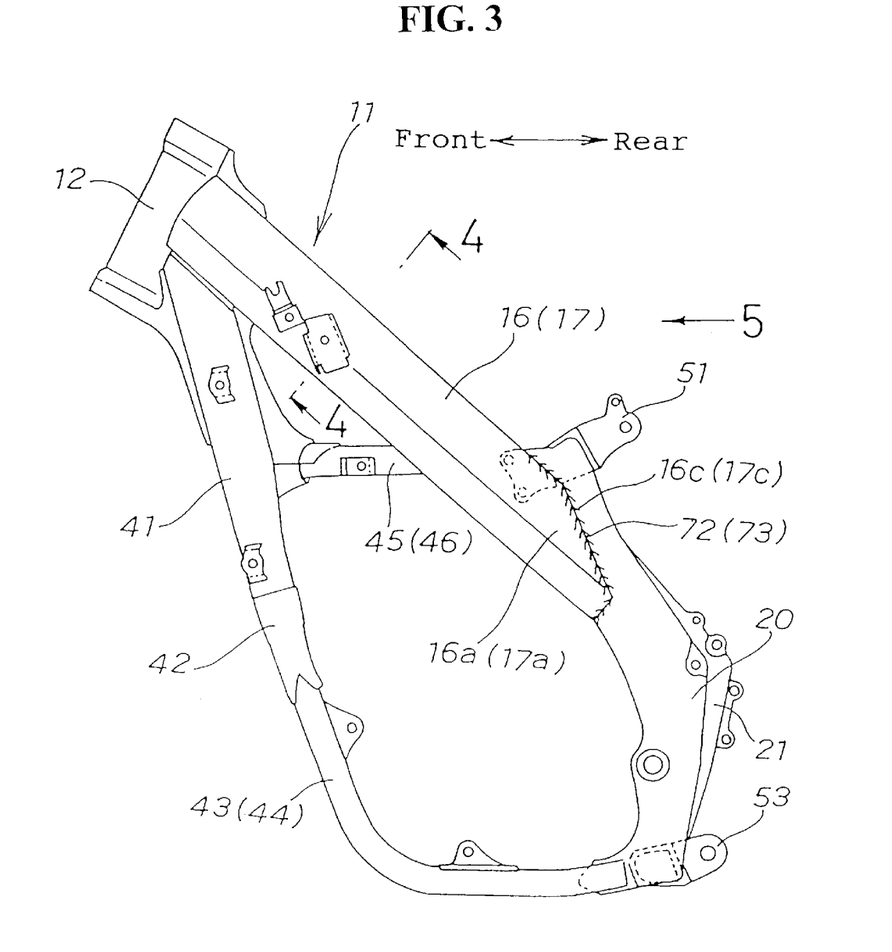
FIG. 3 is a side view of the frame structure (first embodiment) of the motorcycle according to the present invention.

FIG. 3 is a side view of the frame structure (first embodiment) of the motorcycle according to the present invention, showing a state in which the vehicle body frame 11 is constructed of the head pipe 12 with the left and right mainframes 16, 17, the left and right pivot plates 20, 21, the down tube 41 and the gusset 42 operatively connected thereto. The left and right lower pipes 43, 44, the left and right stiffener pipes 45, 46, and the upper and lower supporting brackets 51, 53 are provided as described in conjunction with FIG. 2.

The joint 72 between the left mainframe 16 and the left pivot plate 20 and the joint 73 between the right mainframe 17 and the right pivot plate 21 may be elongated by tipping forward the end faces 16c, 17c of the rear end portions 16a, 17a of the pair of left and right mainframes 16, 17 and joining the pair of left and right pivot plates 20, 21 to the end faces 16c, 17c, respectively.

Therefore, the strength of the joints 72, 73 may be increased so that rigidity of the vehicle body frame 11 may be ensured.

Figure 4:
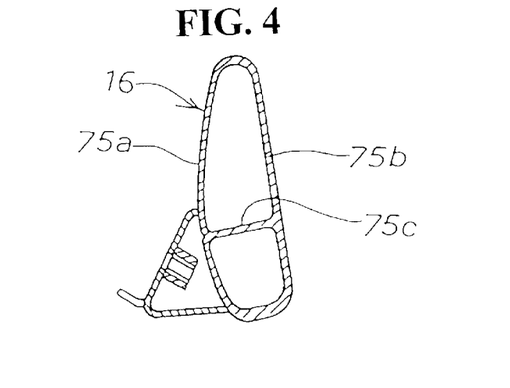
FIG. 4 is a cross-sectional view taken along the line 4—4 of FIG. 3.

FIG. 4 is a cross-sectional view taken along the line 4—4 of FIG. 3 showing the cross section of the left mainframe 16. The left mainframe 16 has a curved outer surface 75a, a flat inner surface 75b and a hollow inside provided with a reinforcing rib 75c.

By making the left mainframe 16 hollow, the weight may be reduced, and by forming a reinforcing rib 75c inside the rigidity of the left mainframe 16 is ensured.

The right mainframe 17 shown in FIG. 3 and the left mainframe 16 are symmetric, and the right mainframe 17 may also be reduced in weight and increased in rigidity in the same manner as the left mainframe 16.

Figure 5:
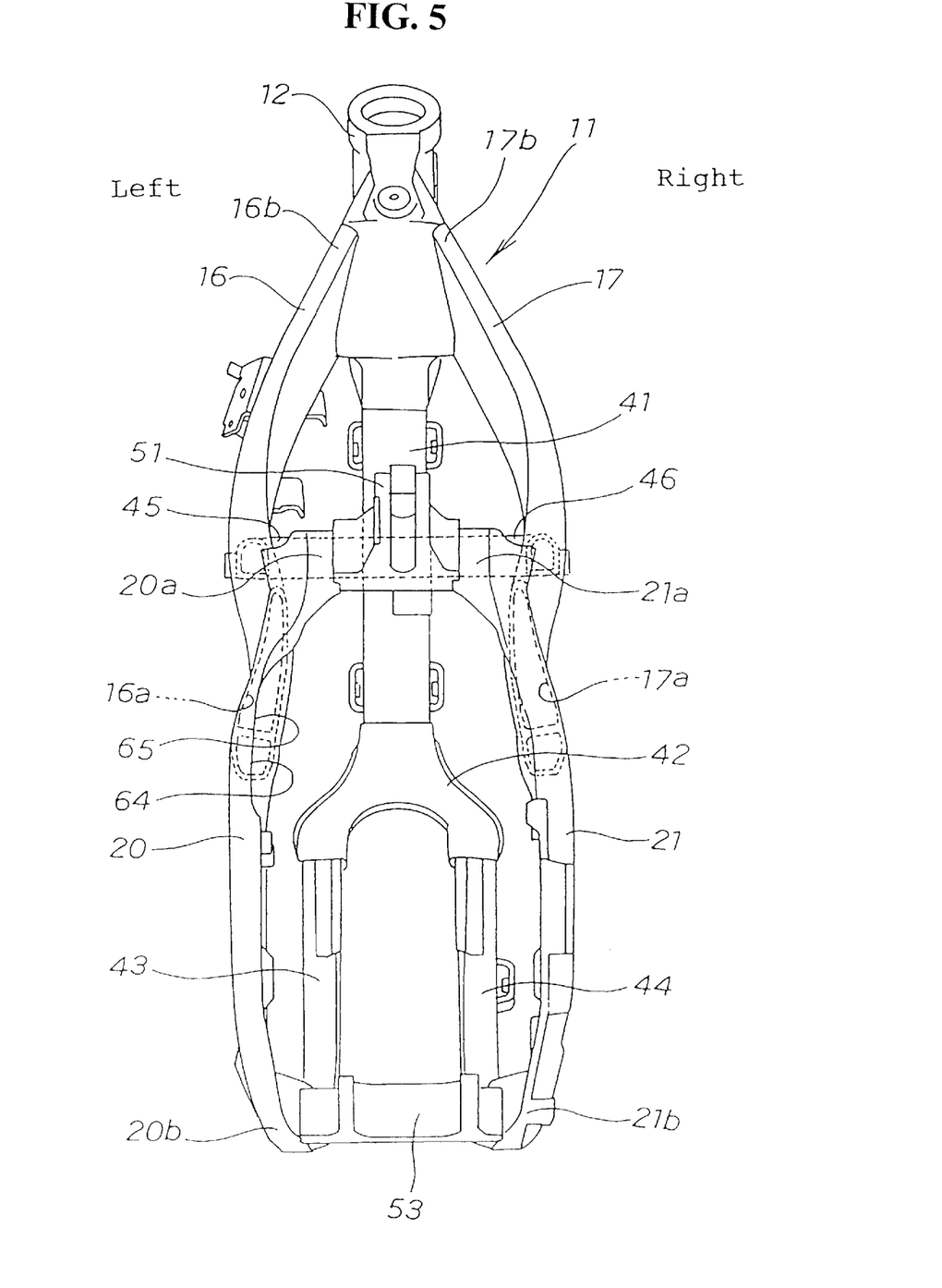
FIG. 5 is a drawing viewed in the direction shown by the arrow 5 in FIG. 3.

FIG. 5 is a drawing viewed in the direction shown by the arrow 5 in FIG. 3, showing a state in which the left and right mainframes 16, 17 extend from the head pipe 12 to the rear of the vehicle body. The left and right pivot plates 20, 21 are joined to the rear end portions 16a, 17a of the mainframes 16, 17 respectively, with the down tube 41 extending downwardly from the front end portion 16b, 17b of the left and right mainframes 16, 17. The left and right lower pipes 43, 44 are mounted to the down tube 41 via the gusset 42 and the left and right lower pipes 43, 44 are joined to the lower end portions 20b, 21b of the pivot plates 20, 21.

FIG. 5 also shows a state in which the recess 65 is formed on the prescribed portion 64 of the left pivot plate 20 (in other words, the portion facing toward the outer surface 59 of the connecting tube shown in FIG. 2). The upper supporting bracket 51 is joined to the upper end portions 20a, 21a of the left and right pivot plates 20, 21, and the lower supporting bracket 53 is joined to the lower end portions 20b, 21b of the left and right pivot plates 20, 21.

Figure 6:
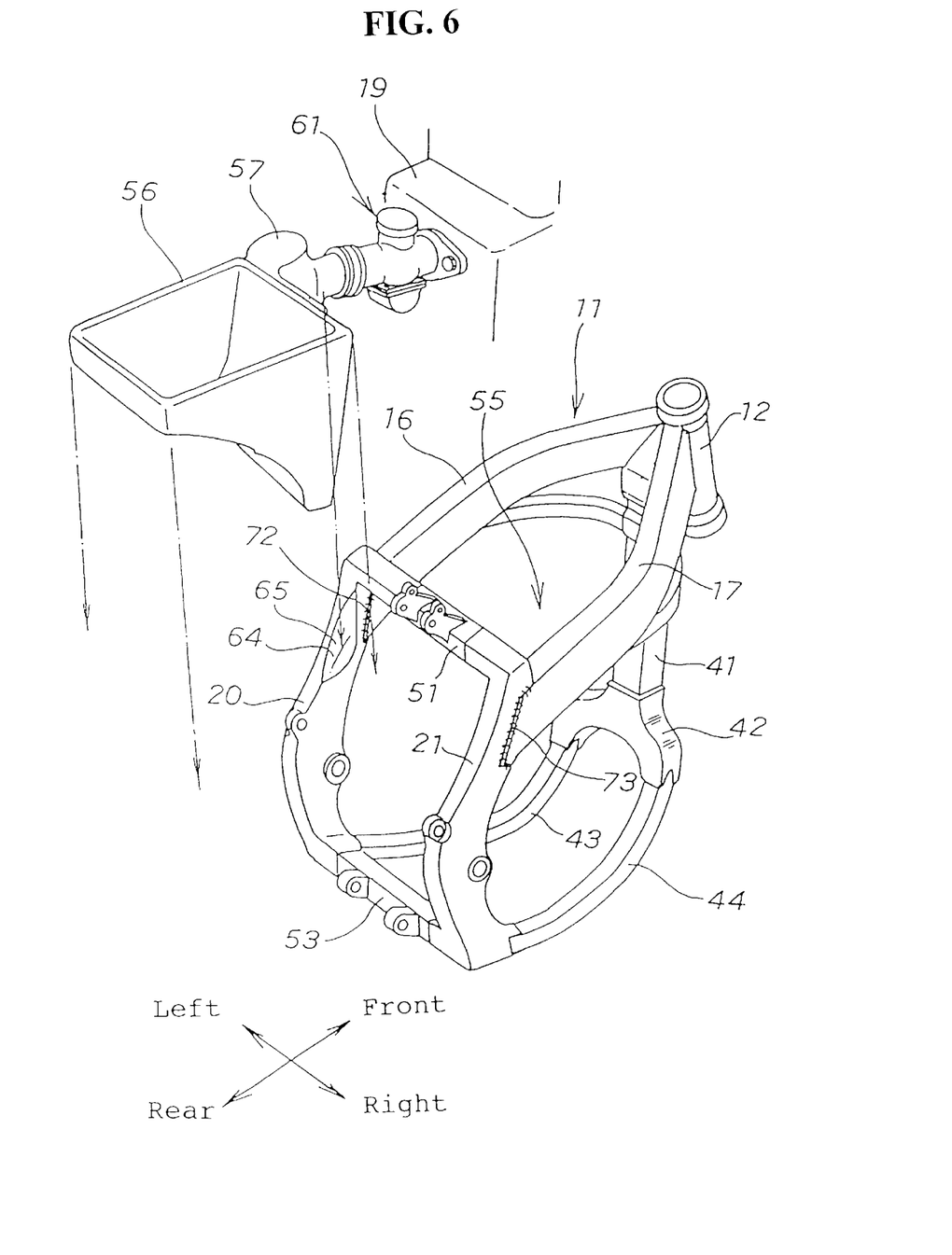
FIG. 6 is a perspective view of a frame structure (first embodiment) of the motorcycle according to the present invention.

FIG. 6 is a perspective view of a frame structure (first embodiment) of the motorcycle according to the present invention, showing a state in which a space 55 for disposing the engine 19 or the like is formed by the vehicle body frame 11. The carburetor 61 is connected to the rear portion of the engine 19. The carburetor 61 and the air cleaner 56 are connected by the connecting tube 57 with the prescribed portion 64 of the left pivot plate 20 facing towards the outer surface 59 of the connecting tube 57 (shown in FIG. 2), and the opposed prescribed portion 64 is formed with the recess 65.

Figure 7:
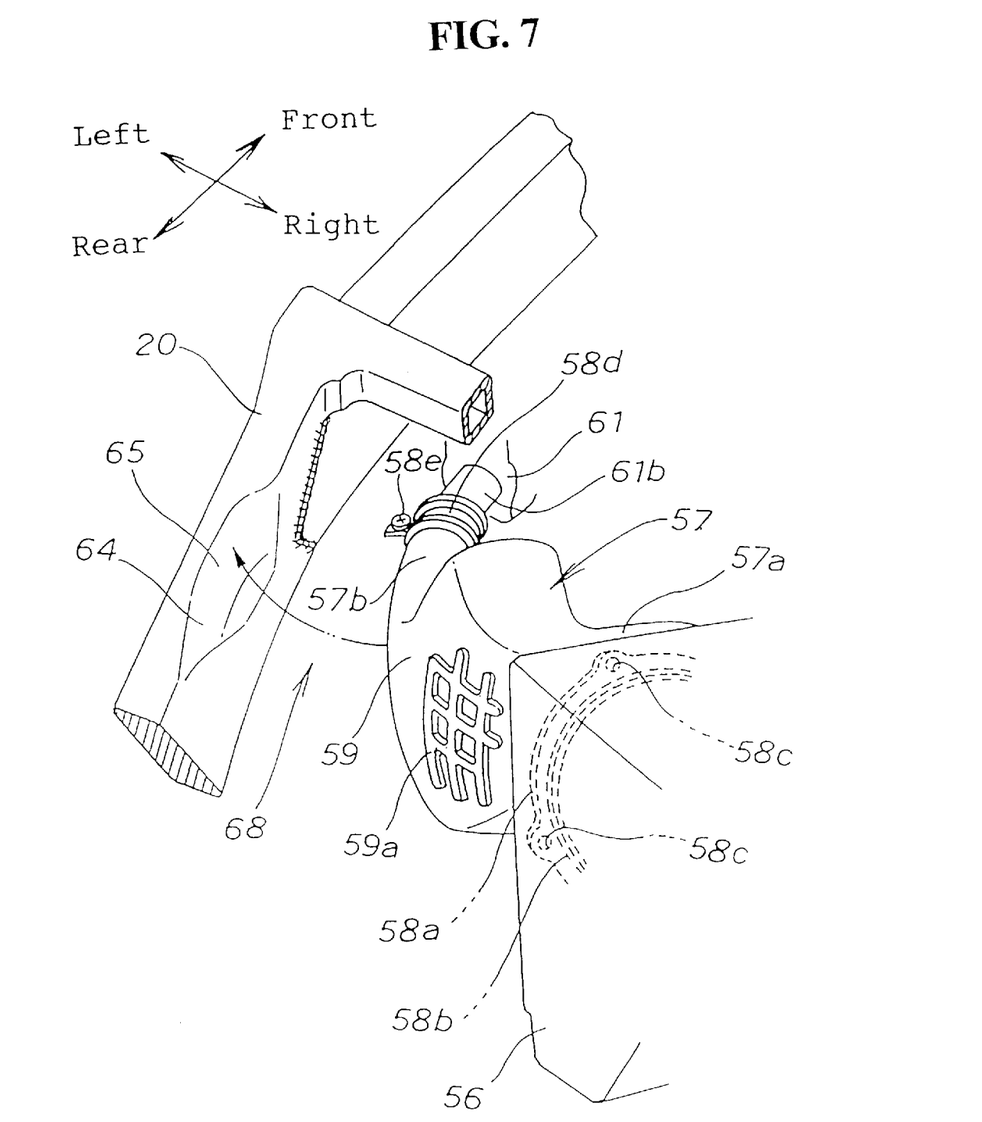
FIG. 7 is an enlarged view of the principal portion of the frame structure (first embodiment) of the motorcycle according to the present invention.

FIG. 7 is an enlarged view of the principal portion of the frame structure (first embodiment) of the motorcycle according to the present invention, showing a state in which the prescribed portion 64 of the left pivot plate 20, or the portion facing toward the outer surface 59 of the connecting tube 57 is formed with the recess 65.

By forming a recess 65 on the prescribed portion 64 of the left pivot plate 20, the space 68 in which the connecting tube 57 is disposed may be increased. Therefore, the freedom of determining the shape of the connecting tube 57 may be increased, and thus the shape of the connecting tube 57 may be suitably determined so as to ensure a smooth flow of air in the connecting tube 57.

The connecting tube 57 is a member for communicating the air cleaner 56 and the carburetor 61 with each other. The flow path of the connecting tube 57 is formed to have a larger cross section corresponding to the air cleaner 56 on the inlet side 57a and a smaller cross section corresponding to the carburetor 61 on the outlet side 57b in order to ensure a smooth air flow from the air cleaner 56 to the carburetor 61. The outer side 59 of the connecting tube 57 is curved so as to be swollen outwardly. The outer surface 59 is also formed with a reinforcing rib 59a.

The connecting tube 57 is connected to the air cleaner 56 by providing a substantially circular mounting portion 58a on the inlet side 57a of the connecting tube 57, disposing an O-ring 58b between the mounting portion 58a and the air cleaner 56, inserting bolts into the mounting holes 58c . . . of the mounting portion 58a, and mounting the mounting portion 58a to the air cleaner 56 with the bolts.

Subsequently, the connecting tube 57 is connected to the carburetor 61 by forming the outlet side 57b of the connecting tube 57 into a cylindrical shape, fitting the outlet side 57b to the inlet side 61b of the carburetor 61, wrapping a clip 58d on the outlet side 57b, and tightening the clip 58d with a bolt 58e.

Figure 8A:
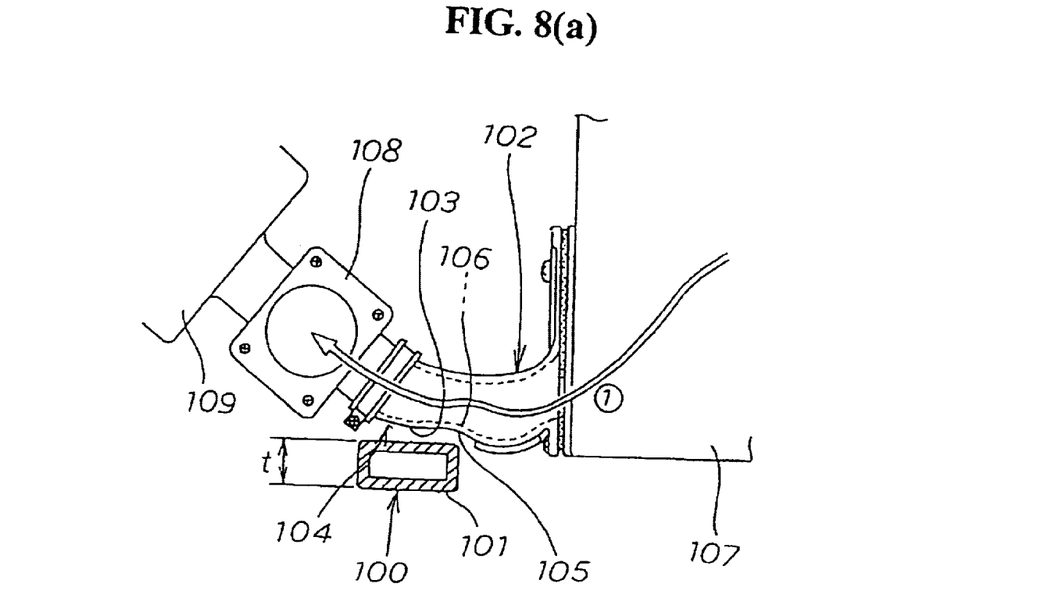
Figure 8B:
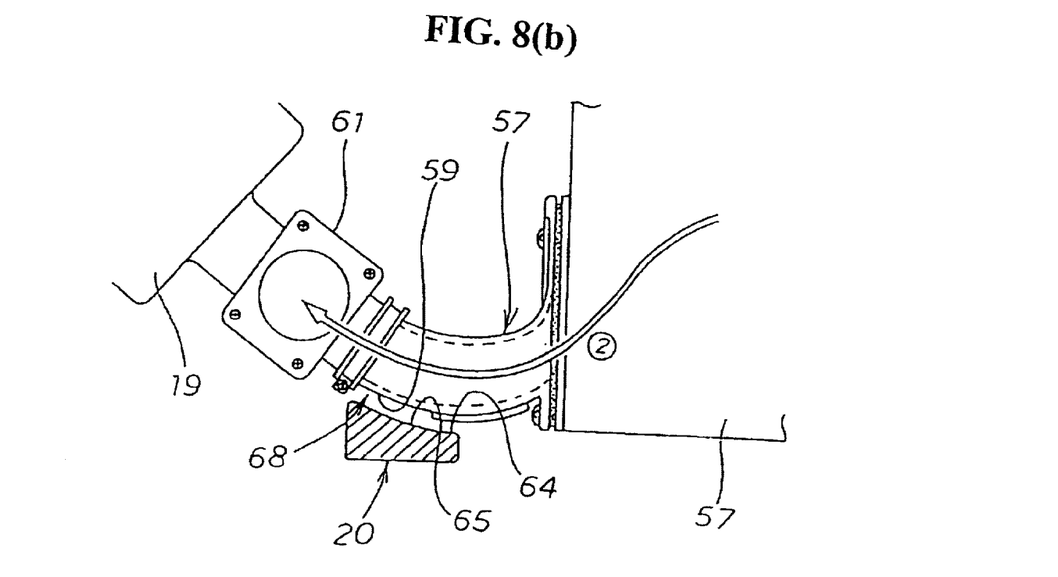

FIGS. 8(a) and 8(b) are explanatory drawings illustrating the action of the connecting tube according to the first embodiment of the present invention, in which FIG. 8(a) illustrates a comparative example, and FIG. 8(b) illustrates the embodiment.

FIG. 8(a) shows a state in which the prescribed portion 101 of the left mainframe 100 faces towards the outer surface 103 of the connecting tube 102.

The left mainframe 100 is extruded by molding, and the cross section is constant along the entire length. The left mainframe 100 must be increased in thickness t in order to ensure the rigidity of the vehicle body frame, and thus the prescribed portion 101 facing towards the outer surface 103 of the connecting tube 102 also has a thickness t.

Therefore, the space 104 for disposing of the connecting tube 102 cannot be increased. Since the space 104 cannot be increased, it is necessary to form a recess 105 on the outer peripheral surface 103 of the connecting tube 102 to avoid interference with the left mainframe 100. By forming the recess 105 on the outer peripheral surface 103 of the connecting tube 102, a projection 106 is formed in the flow passage of the connecting tube 102.

Therefore, when air from the air cleaner 107 is introduced from the carburetor 108 to the engine 109 through the connecting tube 102 as illustrated by the arrow (1), air in the connecting tube 102 cannot flow smoothly. As a consequent, the engine performance of the motorcycle cannot be maintained in a suitable condition.

FIG. 8(b) shows a state in which the left pivot plate 20 faces toward the outer surface 59 of the connecting tube 57. The left pivot plate 20 is a molding formed by casting or forging, and thus the recess 65 can be formed on the prescribed portion 64 of the left pivot plate 20. By forming a recess 65 on the prescribed portion 64, the space 68 for disposing the connecting tube 57 may be increased.

Since the space 68 may be increased, the freedom of determining the shape of the connecting tube 57 may be increased, and thus the flow path of the connecting tube 57 may be curved gently towards the outside.

Therefore, when air from the air cleaner 56 is introduced from the carburetor 61 to the engine 19 through the connecting tube 57 as illustrated by the arrow (2), air can be flown smoothly along the curved flow path of the connecting tube 57. As a consequent, the engine performance of the motorcycle can be maintained in a suitable condition.

In the aforementioned first embodiment, an example is provided wherein the rear end portions 16a, 17a of the pair of left and right mainframes 16, 17 are positioned in the vicinity of the rear end portion 61a of the carburetor 61 that has been described as shown in FIG. 2. However, the position of the rear end portions 16a, 17a of the pair of left and right mainframes 16, 17 are not limited thereto. Another example will be described as a second embodiment.

The frame structure of the second embodiment is such that the rear end portions 16a, 17a of the pair of left and right mainframes 16, 17 are positioned forward of the rear end portions 61a of the carburetor 61.

According to the second embodiment, by positioning the rear portions 16a, 17a of the pair of left and right mainframes 16, 17 forward of the rear end portion 61a of the carburetor 61, the left mainframe 16 can be set apart from the connecting tube 57 so that the left pivot plate 20 faces towards the outer surface 59 of the connecting tube 57 as in the case of the first embodiment. Therefore, the same effect as the first embodiment may be obtained.

In addition, by positioning the rear end portions 16a, 17a of the pair of left and right mainframes 16, 17 forward of the rear end portion 61a of the carburetor 61, the left mainframes 16, 17 can be set apart from the outer surface 59 of the connecting tube 57 more positively. Therefore, the prescribed portion 64 of the left pivot frame 20 may face towards the outer surface 59 of the connecting tube 57 relatively easily to increase the freedom of design when forming the recess 65.

In the aforementioned embodiment, an example wherein the end face 16c of the rear end portion 16a of the left mainframe 16 is inclined so that the upper portion 66a is positioned forward of the lower portion 66b has been described. However, it is also possible to form the end face 16c of the rear end portion 16a of the left mainframe 16 into other shapes.

What is important is to ensure the shape in which the left mainframe 16 can be set apart from the outer surface 59 of the connecting tube 57 so that the left pivot plate 20 can face towards the outer surface 59 of the connecting tube 57.

The present invention being constructed as described above has following advantages.

According to the present invention, by employing a member formed by casting or forging as a pivot plate, a recess for accommodating the outer surface of the connecting tube may be formed at a prescribed portion on the pivot plate during the process of forming the pivot plate. In this manner, by forming a recess at the prescribed portion, a space for disposing the connecting tube may be increased.

By reserving enough space, freedom of determination of the shape of the connecting tube increases, and thus the connecting tube may be formed in a shape that allows for a smooth flow of air therein. Consequently, the engine performance of the motorcycle may be maintained in a suitable condition.

According to the present invention, by inclining the end face of the rear end portion of the mainframe in such a manner that the upper portion is positioned forward of the lower portion, the end face of the rear end portion of the mainframe may be tipped forward to set the mainframe apart from the connecting tube.

By setting the mainframe apart from the connecting tube, the prescribed portion of the pivot frame may face towards the outer surface of the connecting tube. By forming a recess on the prescribed portion, the space in which the connecting tube is to be disposed may be increased.

As a consequent, the freedom of determining the shape of the connecting tube may be increased, and thus the connecting tube may be formed to ensure a smooth flow of air in the connecting tube.

In addition, by tipping forward the end face of the rear end portion of the mainframe, the joint between the mainframe and the pivot plate may be elongated. Therefore, the strength of the joint may be increased, and rigidity of the frame structure of the motorcycle is ensured.

According to the present invention, by positioning the rear end portion of the mainframe in the vicinity of the rear end portion of the carburetor, the rear end portion of the mainframe may be set apart from the connecting tube more positively, so that the prescribed portion of the pivot frame may face towards the outer surface of the connecting tube. By forming a recess on the prescribed portion, the space for disposing of the connecting tube may be increased. Therefore, the freedom of determining the shape of the connecting tube is increased and the connecting tube may be formed so as to ensure smooth flow of air therein.

According to the present invention, by positioning the rear end portion of the mainframe forward of the rear end portion of the carburetor, the rear end portion of the mainframe may be set apart from the connecting tube more positively. Therefore, the prescribed portion of the pivot frame may easily face towards the outer surface of the connecting tube. As a consequent, the prescribed portion of the pivot frame may face towards the outer surface of the connecting tube relatively easily and the freedom of design when forming the recess may be increased.

The invention being thus described, it will be obvious that the same may be varied in many ways. Such variations are not to be regarded as a departure from the spirit and scope of the invention. All such modifications as would be obvious to one skilled in the art are intended to be included within the scope of the following claims.

What is claimed is:

1. In a motorcycle wherein a pair of left and right mainframes extend from a head pipe to a rear portion of a vehicle body, a pivot plate is joined to rear ends of the mainframes, a rear swing arm extends from the pivot plate, an air cleaner is mounted above the rear swing arm, the air cleaner is connected to the carburetor via a connecting tube, and the carburetor is connected to an engine located below the mainframe, a frame structure of a motorcycle comprising:

the pivot plate is formed by casting;
    the pivot plate extends to a position above the rear end portion of the mainframe so that a prescribed portion of the pivot plate faces an outer surface of the connecting tube;
    a recess formed in the prescribed portion of the pivot plate, said recess is formed for accommodating the outer surface of the connecting tube; and
    a rear shock absorber for supporting the rear swing arm, said rear shock absorber being mounted on the upper end portion of the pivot plate extending to a position above the mainframe.

2. The frame structure of a motorcycle according to claim 1, wherein the end face of the rear end portion of the mainframe is inclined in such a manner that the upper portion is positioned forward of the lower portion.

3. The frame structure of a motorcycle according to claim 2, wherein the rear end portion of the mainframe is positioned in the vicinity of the rear end portion of the carburetor.

4. The frame structure of a motorcycle according to claim 2, wherein the rear end portion of the mainframe is positioned forward of the rear end portion of the carburetor.

5. The frame structure of a motorcycle according to claim 1, wherein the rear end portion of the mainframe is positioned in the vicinity of the rear end portion of the carburetor.

6. The frame structure of a motorcycle according to claim 1, wherein the rear end portion of the mainframe is positioned forward of the rear end portion of the carburetor.

7. In a motorcycle wherein a pair of left and right mainframes extend from a head pipe to a rear portion of a vehicle body, a pivot plate is joined to rear ends of the mainframes, a rear swing arm extends from the pivot plate, an air cleaner is mounted above the rear swing arm, the air cleaner is connected to the carburetor via a connecting tube, and the carburetor is connected to an engine located below the mainframe, a frame structure of a motorcycle comprising:

the pivot plate is formed by forging;
    the pivot plate extends to a position above the rear end portion of the mainframe wherein a prescribed portion of the pivot plate faces an outer surface of the connecting tube;
    a recess formed in the prescribed portion of the pivot plate, said recess is formed for accommodating the outer surface of the connecting tube; and
    a rear shock absorber for supporting the rear swing arm, said rear shock absorber being mounted on the upper end portion of the pivot plate extending to a position above the mainframe.

8. The frame structure of a motorcycle according to claim 7, wherein the end face of the rear end portion of the mainframe is inclined in such a manner that the upper portion is positioned forward of the lower portion.

9. The frame structure of a motorcycle according to claim 8, wherein the rear end portion of the mainframe is positioned in the vicinity of the rear end portion of the carburetor.

10. The frame structure of a motorcycle according to claim 8, wherein the rear end portion of the mainframe is positioned forward of the rear end portion of the carburetor.

11. The frame structure of a motorcycle according to claim 7, wherein the rear end portion of the mainframe is positioned in the vicinity of the rear end portion of the carburetor.

12. The frame structure of a motorcycle according to claim 7, wherein the rear end portion of the mainframe is positioned forward of the rear end portion of the carburetor.

13. A motorcycle frame comprising:

a headpipe;
    a pair of left and right mainframes extending from the head pipe to a rear portion of the motorcycle frame;
    a pivot plate joined to rear ends of the mainframes;
    a rear swing arm extending from the pivot plate; and
    an air cleaner mounted above the rear swing arm, said air cleaner being connected to a carburetor via a connecting tube;
    said pivot plate extending to a position above the rear end portion of the mainframe so that a prescribed portion of the pivot plate faces an outer surface of the connecting tube;
    a recess formed in the prescribed portion of the pivot plate, said recess is formed for accommodating the outer surface of the connecting tube.

14. The motorcycle frame according to claim 13, wherein the end face of the rear end portion of the mainframe is inclined in such a manner that the upper portion is positioned forward of the lower portion.

15. The motorcycle frame according to claim 14, wherein the rear end portion of the mainframe is positioned in the vicinity of the rear end portion of the carburetor.

16. The motorcycle frame according to claim 14, wherein the rear end portion of the mainframe is positioned forward of the rear end portion of the carburetor.

17. The motorcycle frame according to claim 13, wherein the rear end portion of the mainframe is positioned in the vicinity of the rear end portion of the carburetor.

18. The motorcycle frame according to claim 13, wherein the rear end portion of the mainframe is positioned forward of the rear end portion of the carburetor.

* * * * *